United States Patent [19]

Zibrida

[11] Patent Number: 4,698,163

[45] Date of Patent: * Oct. 6, 1987

[54] TREATMENT OF PHOSPHATE-CONTAINING WASTEWATER

[75] Inventor: John F. Zibrida, St. Petersburg, Fla.

[73] Assignee: AMAX Inc., Greenwich, Conn.

[*] Notice: The portion of the term of this patent subsequent to Apr. 14, 2004 has been disclaimed.

[21] Appl. No.: 796,821

[22] Filed: Nov. 12, 1985

[51] Int. Cl.$^4$ .............................................. C02F 1/52
[52] U.S. Cl. .................................... 210/713; 210/724; 210/726; 210/906; 210/915; 423/321 R
[58] Field of Search ........ 210/702, 713, 714, 724–728, 210/903, 906, 915; 423/305, 310, 321 R

[56] References Cited

U.S. PATENT DOCUMENTS

| | | | |
|---|---|---|---|
| 3,551,332 | 12/1970 | Baumann | 210/915 |
| 3,725,265 | 4/1973 | Legal | 210/915 |
| 4,320,012 | 3/1982 | Palm et al. | 210/713 |

FOREIGN PATENT DOCUMENTS

| | | | |
|---|---|---|---|
| 50-47456 | 4/1975 | Japan | 210/915 |
| 54-109248 | 8/1979 | Japan | 210/727 |

OTHER PUBLICATIONS

Mooney et al. "Removal of F & P from H$_2$PO$_4$ Wastes with 2-Stage Lime Treatment," Ind. Waste Conf. Purdue University, 1978, pp. 286–295.

Primary Examiner—Peter Hruskoci
Attorney, Agent, or Firm—Michael A. Ciomek; Eugene J. Kalil

[57] ABSTRACT

A method is provided for treating contaminated wastewater of pH ranging from about 1.5 to 3 containing phosphate ions and fluoride ions. The method comprises treating the said wastewater with an amount of alkaline agent selected from the group consisting of limestone (CaCO$_3$) and lime [CaO or Ca(OH)$_2$] sufficient to raise and maintain the pH at a level of about 3.5 to 6.5 following uniform mixing thereof in a first stage precipitation step to effect substantial precipitation of the contaminants. The treated wastewater is passed to a first stage settler to effect solid/liquid separation and provide a sludge of the precipitated contaminants which is removed and separated to provide an effluent substantially impoverished in the aforementioned contaminants, following which the contaminant-impoverished effluent is treated in a second stage precipitation step with lime in an amount sufficient to raise and maintain the pH of the effluent at a level of at least about 10.5 to effect further precipitation of said contaminants having improved settling properties, which precipitate is separated and removed to provide a clear effluent characterized in that further precipitation of solids therein is substantially minimized or eliminated downstream from where the effluent is discharged.

7 Claims, 1 Drawing Figure

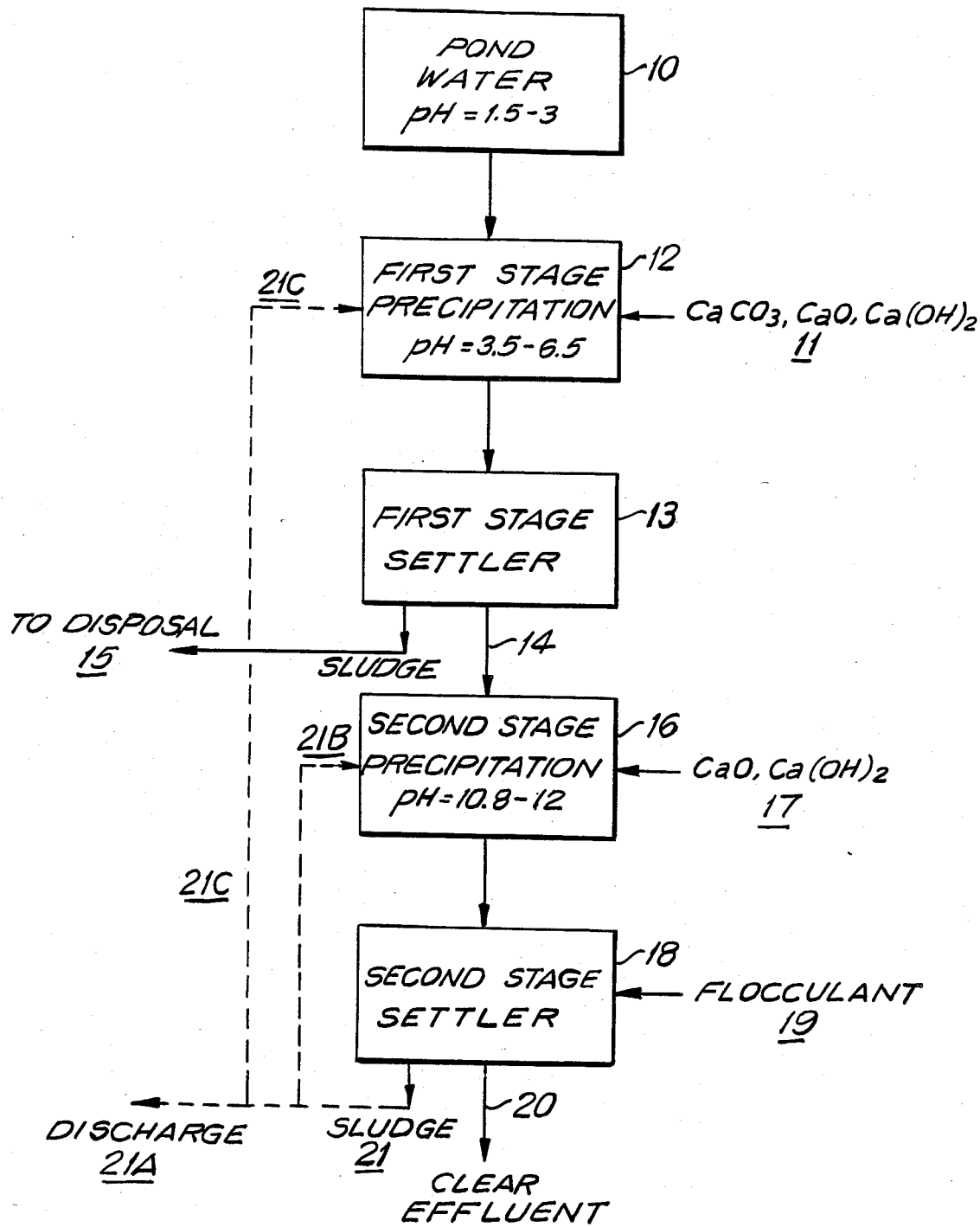

TREATMENT OF PHOSPHATE-CONTAINING WASTEWATER

This invention relates to a method for treating phosphate-containing wastewater to remove polluting constituents therefrom, such as phosphate ions, fluoride ions, and other impurities.

STATE OF ART

It is known to treat wastewater to remove polluting constituents therefrom. A particular wastewater of concern is that derived from the manufacture of phosphate chemicals and/or derived from fertilizer manufacturing plants. State and federal agencies have steadily increased the requirements for wastewater treatment before the effluent thereof is disposed of into the immediate environment. Contaminants of particular concern include fluoride ions and phosphate ions, among other impurities.

In U.S. Pat. No. 4,320,012 to Palm et al, a method is disclosed for treating wastewater derived from phosphoric acid manufacture. In phosphate complexes of the type for the manufacture of phosphate chemicals or for the manufacture of wet process phosphoric acid, water is employed as a coolant for gas streams created within the complex. According to the Palm et al patent, the cooling water absorbs and dissolves various materials and is sent to a pond for cooling. Such waters have a pH in the range of about 1.5 to 2 and contain dissolved solids, such as fluorides and phosphates.

Because limits have been set by various state and federal agencies as to the acceptable amounts of fluorides, phosphates, and other impurities permitted in surface waters, such impurities must be removed before wastewater is disposed of into the environment.

The method proposed by Palm et al comprises neutralizing the wastewater in two stages. The acidic wastewater is first neutralized to a pH of about 3 to 4.5 to precipitate solids therefrom, said solids comprising calcium fluoride, calcium phosphate and calcium sulfate or gypsum, where sulfate ions are present. The neutralizing agent employed may be finely divided limestone ($CaCO_3$) or lime ($CaO$ or $Ca(OH)_2$), limestone being preferred in the first stage neutralization for economic reasons.

Following removal of the precipitate, the aqueous effluent remaining is neutralized further in a second stage at a pH of about 9 to 10 using lime wherein a flocculent precipitate is obtained which further reduces the amount of retained fluorides and phosphorus to meet the limits prescribed by federal and state regulatory agencies. However, when this process is conducted on a commercial scale, the final effluent, following the second neutralization, tends to have a milky appearance (i.e., still contains significant amounts of suspended solids) and may require additional dilution water of higher purity to achieve receiving water standards for impurity discharge.

It would be desirable to provide a method for treating wastewater derived during the manufacture of phosphoric acid or other phosphate chemicals wherein impurities are removed and wherein a clear, substantially non-milky effluent is provided.

OBJECTS OF THE INVENTION

It is thus an object of the invention to provide a method for removing impurities from wastewater and provide an effluent thereof that can be safely discharged into the environment after suitable pH adjustment.

Other objects will more clearly appear when taken in conjunction with the following disclosure and the appended claims.

BRIEF DESCRIPTION OF THE DRAWING

The accompanying drawing is a flowsheet illustrating one embodiment for removing impurities from wastewater derived from the manufacture of wet process phosphoric acid or from wastewater effluents obtained from fertilizer plants.

SUMMARY OF THE INVENTION

As stated hereinabove, the Palm, et al. patent discloses a method for treating phosphate-containing wastewater for removing impurities therefrom by using a double-neutralization process in which acidic wastewater of pH about 1.5 to 2.0 is neutralized in a first stage with finely divided limestone ($CaCO_3$) to a pH of about 4 to remove such impurities as fluoride ions, phosphate ions, and the like, in the form of a precipitate which is removed to provide an effluent or raffinate which is treated in a second stage by further neutralization to raise the pH to about 9 to 10 to precipitate additional fluorides and phosphates, generally as a flocculent precipitate having a low settling rate.

However, as stated earlier, the final effluent, following removal of the second precipitate, tends to still contain significant amounts of fluoride, phosphates, and suspended solids which may not comply with standards for receiving waters.

I have found that I can produce a substantially crystal clear disposable effluent. In addition, I have found that by carrying out the second stage precipitation at a higher neutralization pH of at least about 10.5, e.g., about 10.8 to about 12, more efficient settling characteristics are obtained and lower amounts of fluorides, phosphates and suspended solids are achieved. I have further found that less flocculating agents are required to collect the precipitate, thus decreasing the cost of treatment.

Advantageously, at least a portion of the sludge from the second stage settler is recycled to the second stage precipitation to further improve lime utilization and the settling characteristics.

DETAILS OF THE INVENTION

In its broad aspects, the present invention, as in the aforementioned Palm et al patent, employs a two-stage precipitation process but differs in that the second stage is modified to provide a final effluent which is substantially free of solids and which contains lower concentrations of fluorides, phosphates and other contaminants.

A typical phosphate-containing and fluoride-containing pond water which may be treated in accordance with the invention has the following composition:

TABLE 1

| Substance | Range, ppm |
|---|---|
| pH | 1.5-3 |
| Fluoride ions (F) | 500-8000 |
| Phosphate ions (P) | 1000-10,000 |
| Total solids (TDS)* | 10,000-50,000 |

*Total dissolved solids.

In carrying the invention into practice, the first stage precipitation is accomplished using lime [$CaO$, Ca- (OH)₂] or limestone (CaCO₃), the choice depending upon economic considerations. The amount added should be sufficient to raise and maintain the pH to about 3.5 to 6.5. Referring to the flowsheet of the drawing, lime or limestone 11 is added to acidic pond water or wastewater 10 fed to first stage precipitation 12 to raise and maintain the pH to about 3.5 to 6.5. The lime or limestone may be added as a slurry or as a solid. The wastewater with the liming reagent therein is uniformly mixed at said pH of about 3.5 to 6.5.

Following mixing, during which solids precipitate from solution, the wastewater is passed on to first stage settler 13 where the precipitate is collected as a slurry and solid/liquid separation effected at 14, with the solids removed as sludge for disposal at 15. The aqueous effluent remaining is passed to second stage precipitation 16 to which lime 17 [CaO and/or Ca(OH)₂] is added preferably as a slurry, sufficient to raise and maintain the pH to at least about 10.5, and preferably at about 10.8 to about 12.

It is important to maintain the pH at such high levels as the precipitate that forms settles more efficiently and clarifies more easily. In addition, less flocculant 19 is required to collect the precipitate, for example, less than 25% of what is normally used for the purpose. Any flocculant well known in the art can be used. Following settling at 18 (second stage settler), a substantially clear non-milky aqueous effluent 20 is obtained after removal of sludge 21 by solid/liquid separation, a portion of the sludge 21B (about 30% to 90% by volume) being preferably recycled to second precipitation stage 16 to improve lime utilization and settling characteristics. The remaining sludge 21 being discharged (21A) and/or recycled as 21C to first stage precipitation 12.

The sludge 21 removed from the second precipitation stage is comprised of fluorides and phosphates and unreacted lime. The aqueous effluent 20 after pH adjustment meets the standards of the federal and state regulatory agencies for fluorides, phosphates and total solids.

Second stage precipitation to pH values in excess of about 10.5 significantly lowers the final concentration of phosphate and fluoride ions in the effluent. Two stage liming is currently conducted to provide a final pH value of approximately 9.5 so that the effluent can be discharged without further treatment. It appears that the solubility of calcium fluoride passes through a minimum at a pH value of about 5.5, after which point the solubility increases to a second maximum. I have found that by using the pH value of about 10.5 during the second stage neutralization, the fluoride ion concentration can be lowered to less than about 10 ppm (F), and advantageously to less than about 5 ppm (F), as compared to present commercial practice values of up to about 20 ppm (F) or more. At final pH values in excess of about 10.5 the phosphate ion concentration is lowered to less than about 5 ppm (P), e.g., less than about 2 ppm (P), as compared to present commercial practice of between about 15 to 25 ppm (P).

Phosphates concentrations are expressed as phosphorus contained in the phosphates. In order to emphasize the use of this basis of measurement, phosphorus will be symbolically expressed as (P).

Under current practice, at a pH level of about 9.5, the effluent 20 upon discharge contains an excess of about 20 ppm phosphate (P) which continues to precipitate with time. This results in an increase in suspended solids content, which suspended solids may deposit downstream of said discharge. The elevated level of phosphate occurring after discharge is disadvantageous because it increases the nutrient loading of the receiving waters. The process in accordance with the present invention avoids these problems by lowering the phosphate ion content upon discharge to such low levels that delayed precipitation is minimized or eliminated.

The present invention is applicable to phosphate-containing wastewaters containing at least about 100 ppm phosphorus (P) as phosphate ions and at least about 50 ppm fluorine (F) as fluoride ions.

In summary, the invention is directed to a method for the treatment of contaminated wastewater of pH ranging about 1.5 to 3 containing at least about 100 ppm phosphorus as phosphate ions and at least about 50 ppm fluorine as fluoride ions. The method comprises treating the wastewater, e.g., pond water (10), with an amount of an alkaline agent selected from the group consisting of limestone (CaCO₃) and lime [CaO or Ca(OH)₂] sufficient to raise and maintain the pH at a level of about 3.5 to 6.5 following uniform mixing thereof in a first stage precipitation 12 to effect substantial precipitation of said contaminants. The treated wastewater is then passed to a first stage settler (13) to effect solid/liquid separation thereof sufficient to provide a sludge of said precipitated contaminants which is removed and separated to provide an effluent substantially impoverished in said contaminants.

The contaminant-impoverished effluent is then treated in a second stage precipitation (16) with lime in an amount sufficient to raise and maintain the pH of the effluent at a level of at least about 10.5 following uniform mixing thereof, whereby a further precipitate of the contaminants is produced having improved settling properties. The time-treated effluent at the aforementioned pH is passed to a second stage settler (18) at which a flocculant (19) is added to provide flocs of the precipitate which settle rapidly to form a sludge thereof and a clear effluent, following which the sludge is removed and the effluent discharged, whereby a clearer effluent is provided characterized in that further precipitation of solids is substantially minimized or eliminated downstream of effluent discharge. If it is desired to discharge the effluent into the environment, a mineral acid or an acid-forming constituent can be added to adjust the pH to a value of about 8.5 or less, e.g., about 6 to about 8.5.

As stated herein before, a portion of the sludge discharged from the second stage settler (e.g., about 30% to 90% by volume) may be recycled to second stage precipitation, the remaining portion being either discharged and/or recycled to first stage precipitation. The recycle to either the first stage or second stage precipitation can be advantageous in cutting down an over-all lime consumption.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for the treatment of contaminated wastewater of pH ranging from about 1.5 to 3 containing at least about 100 ppm phosphorus as phosphate ions and at least about 50 ppm fluorine as fluride ions which comprises:

treating said wastewater with an amount of an alkaline agent selected from the group consisting of limestone ($CaCO_3$) and lime sufficient to raise and maintain the pH at a level of about 3.5 to 6.5 following uniform mixing thereof in a first stage precipitation to effect substantial precipitation of said contaminants, passing said treated wastewater to a first stage settler to effect solid/liquid separation thereof sufficient to provide a sludge of said precipitated contaminants which is removed for disposal thereof and provide an effluent substantially impoverished in said contaminants, treating said contaminant-impoverished effluent in a second stage precipitation with lime in an amount sufficient to raise and maintain the pH of said effluent at a level of at least about 10.8 to less than 12 following uniform mixing thereof, whereby a further precipitate of said contaminants is produced having improved settling properties, passing said lime-treated effluent at said pH to a second stage settler at which a flocculant is added to provide flocs of said precipitate which settle rapidly to form a sludge thereof and a clearer effluent, removing said sludge and discharging said effluent containing less than about 5 ppm phosphorus and less than about 10 ppm fluoride ions, whereby a clearer effluent is provided characterized in that further precipitation of solids is substantially minimized or eliminated downstream of said effluent discharge.

2. The method of claim 1, wherein a portion of the sludge from the second stage settler is recycled to second stage precipitation.

3. The method of claim 2, whrein the sludge portion recycled to second stage precipitation amounts to about 30% to 90% by volume of the sludge discharged from the second settler.

4. The metohd of claim 3, wherein the sludge remaining following sludge recycle from the second stage settler is discharged and/or recycled to first stage precipitation.

5. A method for the treatment of contaminated wastewater of pH ranging from about 1.5 to 3 containing at least about 100 ppm phosphorus as phosphate ions and at least about 50 ppm fluorine as fluoride ions which comprises:

treating said wastewater with an amount of an alkaline agent selected from the group consisting of limestone ($CaCO_3$) and lime sufficient to raise and maintain the pH at a level of about 3.5 to 6.5 following uniform mixing thereof in a first stage precipitation to effect substantial precipitation of said contaminants, passing said treated wastewater to a first stage settler to effect solid/liquid separation thereof sufficient to provide a sludge of said precipitated contaminants which is removed for disposal thereof and provide an effluent substantially impoverished in said contaminants, treating said contaminant-impoverished effluent in a second stage precipitation with lime in an amount sufficient to raise and maintain the pH of said effluent at a level of at least about 10.8 to less than 12 following uniform mixing thereof, whereby a further precipitate of said contaminants is produced having improved settling properties, passing said lime-treated effluent at said pH to a second stage settler at which a flocculant is added to provide flocs of said precipitate which settle rapidly to form a sludge thereof and a clear effluent, removing said sludge and discharging said effluent containing less than about 2 ppm phosphorus and less than about 5 ppm fluoride ions, whereby clearer effluent is provided characterized in that further precipitation of solids is substantially minimized or eliminated downstream of said effluent discharge, and recycling a portion of said sludge from the second stage settler to second stage precipitation.

6. The method of claim 5, wherein the amount of sludge recycled amounts to about 30% to 90% by volume of the sludge discharged from the second stage settler, and wherein the remaining sludge is discharged and/or recycled to first stage precipitation.

7. The method of claims 1 and 5, wherein the effluent prior to discharge is adjusted to a pH value of about 8.5 or less.

* * * * *